Nov. 24, 1964     R. CHAMP     3,158,443
PRODUCTION OF TELLURIUM
Filed April 10, 1961
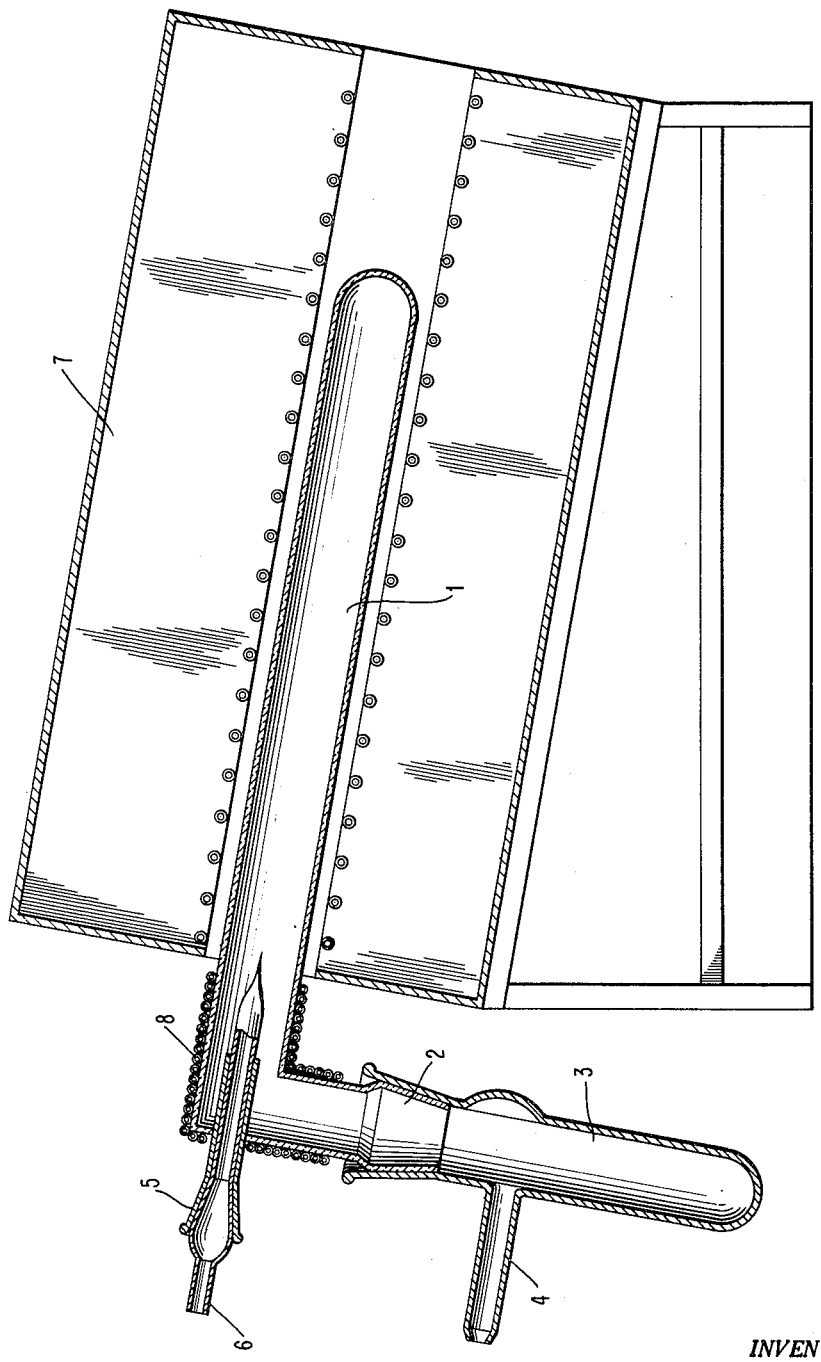
INVENTOR.
ROGER CHAMP
BY *Bauer and Seymour*
ATTORNEYS 3,158,443
PRODUCTION OF TELLURIUM
Roger Champ, Bourg-la-Reine, France, assignor to La
Societe les Produits Semi-Conducteurs, Paris, France
Filed Apr. 10, 1961, Ser. No. 101,983
Claims priority, application France Mar. 13, 1961
9 Claims. (Cl. 23—209)

This invention relates to the purification of tellurium and particularly to a novel method which accomplishes the complete elimination of selenium.

The classical methods of purifying tellurium include, generally, some rather complicated chemical procedures directed particularly to the separation of selenium, which is the principal impurity. It has also been proposed to purify tellurium by the electrolysis of one of its compounds, but that is difficult to do because tellurium does not adhere well to the electrode and the electrode is attacked by the metal. Those processes do not produce tellurium wholly free from impurities nor exempt from selenium.

It is an object of this invention to separate tellurium from its impurities, particularly selenium, by a process which requires no electrolysis and which is accomplished by steps which are readily carried out by ordinary laboratory and commercial manipulations. Another object is to purify tellurium chemically.

The objects of the invention are accomplished, generally speaking, by extracting tellurium tetrachloride from hydrochloric acid solution wtih an organic solvent which is preferably a mixture of ethyl ether and amyl alcohol, separating the phases and washing the organic phase containing tellurium chloride with hydrochloric acid, hydrolyzing the tellurium chloride, for instance with ammonia, and washing the insoluble precipitate with water, reducing the precipitated oxide in a plurality of stages in the first of which the selenium, which has accompanied the tellurium is reduced and vaporized, and in the second of which, at higher temperature the tellurium oxide is reduced to elemental tellurium, still containing some impurities. The elemental tellurium is then sublimed, first at lower and then at higher temperature and at lower and higher vacuum respectively, preferably under an inert or reducing atmosphere.

In carrying out the invention tellurium tetrachloride dissolved in aqueous hydrochloric acid is subjected to a methodical extraction in the first stage of which ethyl ether acts to strip the HCl solution of the tellurium. The ethyl ether is preferably extended with amyl alcohol for reasons hereinafter to be explained. The tellurium tetrachloride in the organic phase is then transformed to oxide and the oxide is reduced at high temperature preferably by hydrogen. The purification of the tellurium is carried out by sublimation.

I have discovered that the coefficient of separation of tellurium between the hydrochloric acid solution of tellurium tetrachloride and ethyl ether is very close to unity, while the coefficient of separation of selenium tetrachloride between the same liquids is practically zero and that this also applies to other impurities which are frequently found with tellurium such as Bi, Sb and Cu.

Ethyl ether, while constituting an excellent extractor is very soluble in HCl solution so that during the extraction the hydrochloric acid phase, increased by the ether, has a volume much larger than that of the ether phase, which impairs the extraction particularly when one uses extraction apparatus such as that of Craig or of O'Keffe. I have established, and this constitutes a particular characteristic of the invention, that this inconvenience is avoided if one adds to the ethyl ether some amyl alcohol. Amyl alcohol has the effect of reducing the solubility of ether in the HCl solution and, for useful proportions of the liquid constituents of the organic phase, the volumes of the aqueous and organic phases should be roughly equal during the course of the extraction. I have also established that the most advantageous proportions are between 10 and 50 parts by volume of amyl alcohol for 90 to 50 parts by volume of the ether. In particular, the mixture of 30% by volume of amyl alcohol and 70% by volume of ethyl ether gives excellent results. The relations between the coefficient of separation of tellurium and its impurities are not substantially modified by the presence of amyl alcohol.

These mixtures used in the extraction of tellurium tetrachloride from hydrochloric acid may be used throughout a wide range of concentrations of tellurium in the acid and I have found that in practice one may use acid solutions containing from 50 to 200 grams per liter of tellurium, when the free acidity of the acid solution is between 1 N and 10 N, but a preferred concentration of tellurium is about 100 grams per liter at a free acidity of 6 N. Under these conditions, the volume of the organic extractor mixture may be equal to the volume of the hydrochloric acid solution.

After extraction the organic phase is separated from the acid phase and washed wtih HCl, then the tellurium tetrachloride is hydrolyzed, for instance by ammonia and transformed to tellurium oxide which constitutes a precipitate which is insoluble in the organic phase and can be washed with water. Selenium oxide is included in the precipitate but it is very soluble in water and is thus readily removed.

The oxide of tellurium thus isolated is reduced at high temperature by hydrogen in two stages, in the first of which the temperature is maintained between 450–500° C. which permits the complete elimination of the oxide of selenium, of which the vapor tension is high above 400° and which is consequently entrained by the current of hydrogen without the ability to form a condensate in the cold parts of the apparatus. After the selenium oxide has been vaporized the temperature is raised to about 600°, which reduces the oxide of tellurium to the metal which has high purity.

If one wishes to still further continue the purification and produce tellurium having less than about one part per million of each impurity, the tellurium obtained by reduction is further purified by sublimation. It is advantageous to repeatedly use a double sublimation, in each case isolating the first fraction.

The first sublimation is advantageously carried out under high vacuum of about $10^{-3}$ mm. Hg and a temperature of about 400 to 500° C. 5 to 10% of the tellurium treated passes off in the head fractions. The second sublimation is carried out under a lesser vacuum, on the order of several mm. Hg, for instance 1 to 10 mm. Hg and at a temperature on the order of 650° C. This second sublimation should be carried out under a current of hydrogen to prevent the possible formation of oxide. The tellurium thus obtained is practically free from selenium and the customary impurities Cu, Fe, Mg, Pb, Bi, As, Sm, Al, Ni, Mn, Sb and Ce and it is capable of being used directly in the manufacture of semi-conductors.

The following example illustrates the invention without limiting the generality of what is elsewhere stated:

128 grams of tellurium, 99% pure, are chlorinated for 8 hours in gaseous chlorine at 200° C. This forms the black bichloride which is again chlorinated for 6 hours at 230° C. producing the yellow tetrachloride. The chlorine is eliminated and the tetrachloride is dissolved in hydrochloric acid of 6N concentration producing a volume of 1280 liters. The solution contains 100 grams of elemental tellurium per liter. 1,500 liters of a mixture of ethyl ether and amyl alcohol in the proportion of 70% by 30% by volume respectively is mixed with the hydrochloric acid solution in a countercurrent apparatus comprising 6 stages of extraction and three stages of washing. The tetrachloride thus extracted from the hydrochloric acid and dissolved in the organic solution is hydrolyzed by dilute ammonia. The oxide which forms is well washed by decantation with 10 liters of water and dried at 150° C. The oxide is put into containers which are introduced into a silica tube 80 mm. in diameter and 1 meter long and the tube is placed in a cylindrical furnace 80 cm. long. The furnace is heated to 600° and a current of hydrogen is passed through the tube at 200 liters per hour. The heating continues for two hours.

This produces tellurium which is subjected to sublimation at 450 to 500° C. under a vacuum of $10^{-3}$ mm. Hg during the course of which, after the elimination of 8 grams of tellurium in the head fraction, there is recovered 116 grams which is subjected to a second sublimation at about 650° C. under 1 mm. of Hg and a slow current of hydrogen. During the first part of this second sublimation the first 10 grams are eliminated. There follows 102 grams of extra-pure tellurium which are directly useful in the manufacture of semi-conductors.

The figure of the annexed drawing shows by way of example an apparatus which can advantageously be used for the final sublimation. This apparatus includes a tube 1 of transparent silica having a fitting 2 to receive a condenser 3, which has, in turn, a conduit 4 for attachment to a vacuum. The tube 1 may also be put in communication through a valve 6 with a source of hydrogen or inert gas. A resistance furnace 7 serves to heat the tube 1 to a selected temperature and the part of the tube which is outside the furnace is provided with an insulation or a heating coil 8 to control the temperature of the gases on route to the condenser. The advantages of the invention are the production of tellurium of various degrees of high purity, free from selenium and other impurities except possibly to the extent of one or less part per million of each impurity. The novel process proceeds by manipulations which are readily controlled and comparatively simple.

The invention includes a process for making tellurium of high purity which consists in submitting tellurium tetrachloride in aqueous hydrochloric acid solution to methodical extraction by means of ethyl ether, then in transforming the chloride to oxide and reducing the oxide to the metal. The preferred extraction solvent is ethyl ether which is efficacious by itself but is made more satisfactory and manageable by the addition of amyl alcohol. The organic extractor liquid ranges in composition from 10% by volume of amyl alcohol and 90% by volume of ethyl ether to 50% by volume of the alcohol and 50% by volume of ether. A mixture of 30% of alcohol and 70% ether is good. The hydrochloric acid solution of tellurium tetrachloride may contain from about 50 grams to about 200 per liter of tellurium, particularly about 100 grams per liter, the free acidity of the solution being between 1 N and 10 N and preferably about 6 N. After extraction the organic phase is washed with hydrochloric acid and the tetrachloride is hydrolyzed to transform it to tellurium oxide. The oxide is washed with water to eliminate the selenium oxide found in it. The reduction of tellurium oxide by hydrogen is effectuated in a first stage between 450 and 500° C. to get rid of the last of the selenium oxide and then at a temperature about 600° C. This product is tellurium of very high purity but its purity can be raised even higher by sublimation.

As many apparently widely different embodiments of the present invention may be made without departing from the spirit and scope thereof, it is to be understood that the invention is not limited to the specific embodiments.

What is claimed is:

1. In the manufacture of tellurium having no more than about one part per million of each impurity, particularly of selenium, the process of sublimation which comprises preparing tellurium of high purity containing substantially more than one part per million of at least one metallic impurity, heating the tellurium under vacuum of the order of $10^{-3}$ mm. Hg absolute to a temperature of about 400–500° C., isolating the first fraction until 5–10% of the tellurium has been removed, isolating the residue raising the pressure over the residue to the order of several mm. Hg and subliming the residue at about 650° C., and isolating the extra pure tellurium.

2. In the manufacture of tellurium having no more than about one part per million of each impurity, particularly of selenium, the process of sublimation which comprises preparing tellurium of high purity containing substantially more than one part per million of at least one metallic impurity, heating the tellurium under vacuum of the order of $10^{-3}$ mm. Hg absolute to a temperature of about 400–500° C., isolating the first fraction until 5–10% of the tellurium has been removed, separately collecting the residue, raising the pressure over the residue to the order of several mm. Hg and subliming the residue at about 650° C. under a current of reducing gas, and isolating the extra pure tellurium from the sublimed gas.

3. A method of producing tellurium of high purity which comprises mixing a solution, of about 50 to about 200 g./l. Te as TeCl$_4$ in HCl of about 1 N to 10 N concentration; with a mixture of ethyl ether and amyl alcohol containing between 90 and 50 volume percent of ether to between 10 and 50 volume percent of the alcohol, in roughly equal volumes, thereby extracting the TeCl$_4$ from the HCl solution and forming therewith an organic solution, separating the phases, washing the organic solution with HCl, hydrolyzing the TeCl$_4$ in the organic solution by mixing it with dilute ammonia, separating the partly purified TeO$_2$ from the solution, heating the TeO$_2$ with H at a temperature on the order of 450–500° C. and thus vaporizing and separating selenium oxide, raising the temperature to about 600° and thereby completing the reduction of TeO$_2$ to elemental Te, heating the Te at about 450–500° C. at $10^{-3}$ mm. Hg absolute, and isolating the vaporized product, heating the Te at about 650° C. and several mm. Hg in inert gas, and isolating the extra pure tellurium from the sublimed gas.

4. A method of producing an intermediate for the manufacture of tellurium of high purity which comprises mixing a solution, of about 50 to about 200 g./l. Te as TeCl$_4$ in HCl of about 1 N to 10 N concentration, with a mixture of ethyl ether and amyl alcohol containing between 90 and 50 volume percent of ether to between 10 and 50 volume percent of the alcohol in roughly equal volumes, thereby extracting the TeCl$_4$ from the HCl solution and forming therewith an organic solution, and separating the aqueous phase containing impurities from the organic phase containing the Te.

5. The steps in the method of producing tellurium of high purity which comprises mixing a solution, of about 50 to about 200 g./l. Te as TeCl$_4$ in HCl of about 1 N to 10 N concentration, with a mixture of ethyl ether and amyl alcohol containing between 90 and 50 volume percent of ether to between 10 and 50 volume percent of the alcohol in roughly equal volumes, thereby extracting the $TeCl_4$ from the HCl solution and forming therewith an organic solution, separating the phases, washing the organic solution with HCl, hydrolyzing the $TeCl_4$ in the organic solution by mixing it with dilute ammonia, separating the partly purified $TeO_2$ from the solution, heating the $TeO_2$ with H at a temperature on the order of 450–500° C. and thus vaporizing and separating selenium oxide.

6. In the manufacture of tellurium in which tellurium tetrachloride occurs with metallic impurities in organic medium, the process which comprises hydrolyzing tellurium tetrachloride in organic solution by mixing it with dilute ammonia, separating the partly purified $TeO_2$ from the solution, heating the $TeO_2$ with H at a temperature on the order of 450–500° C. and thus vaporizing and separating selenium oxide, raising the temperature to about 600° C. and thereby completing the reduction of $TeO_2$ to elemental Te.

7. In the manufacture of tellurium in which tellurium tetrachloride occurs with metallic impurities in organic medium, the process which comprises hydrolyzing tellurium tetrachloride in organic solution by mixing it with dilute ammonia, separating the partly purified $TeO_2$ from the solution, heating the $TeO_2$ with H at a temperature on the order of 450–500° C. and thus vaporizing and separating selenium oxide, raising the temperature to about 600° C. and thereby completing the reduction of $TeO_2$ to elemental Te, heating the Te under vacuum of the order of $10^{-3}$ mm. Hg absolute to a temperature of about 400–500° C., isolating the first fraction until 5–10% of the Te has been removed, raising the pressure over the residue to the order of several mm. Hg and heating it at about 650° C. under a current of reducing gas, and isolating the extra pure Te from the sublimed gas.

8. A method of producing tellurium of high purity which comprises mixing a solution, of about 50 to about 200 g./l. Te as $TeCl_4$ in HCl of about 1 N to 10 N concentration, with a mixture of ethyl ether and amyl alcohol containing between 90 and 50 volume percent of ether to between 10 and 50 volume percent of the alcohol in roughly equal volumes, thereby extracting the $TeCl_4$ from the HCl solution and forming therewith an organic solution, separating the phases, washing the organic solution with HCl, hydrolyzing the $TeCl_4$ in the organic solution by mixing it with dilute ammonia, separating the partly purified $TeO_2$ from the solution, heating the $TeO_2$ with H at a temperature on the order of 450–500° C. and thus vaporizing and separating selenium oxide, raising the temperature to about 600° C. and thereby completing the reduction of $TeO_2$ to elemental Te, heating the Te under vacuum of the order of $10^{-3}$ mm. Hg absolute to a temperature of about 400–500° C., isolating the first fraction until 5–10% of the Te has been removed, subliming the residue at a pressure on the order of several mm. Hg and at about 650° C. under a current of reducing gas, and isolating the extra pure tellurium.

9. A method of producing tellurium of high purity which comprises mixing a solution, of about 50 to about 200 g./l. Te as $TeCl_4$ in HCl of about 1 N to 10 N concentration, with a mixture of ethyl ether and amyl alcohol containing between 90 and 50 volume percent of ether to between 10 and 50 volume percent of the alcohol in roughly equal volumes, thereby extracting the $TeCl_4$ from the HCl solution and forming therewith an organic solution, separating the phases, washing the organic solution with HCl, hydrolyzing the $TeCl_4$ in the organic solution by mixing it with dilute ammonia to form $TeO_2$, separating the partly purified $TeO_2$ from the solution, heating the $TeO_2$ at a temperature on the order of 450–500° C. under a current of H and thus vaporizing and separating selenium oxide, raising the temperature to about 600° C. under a current of H and thereby completing the reduction of $TeO_2$ to elemental Te, heating the Te under vacuum of the order of $10^{-3}$ mm. Hg absolute to a temperature of about 400–500° C., isolating the first fraction until 5–10% of the Te has been removed, raising the pressure to 1 to 10 mm. Hg over the residue and heating it at about 650° C. under a current of H, and isolating the Te from the sublimed gas.

References Cited in the file of this patent

UNITED STATES PATENTS

| | | |
|---|---|---|
| 2,211,119 | Hixon et al. | Aug. 13, 1940 |
| 2,413,374 | Phillips et al. | Dec. 31, 1946 |
| 2,414,294 | Gardner | Jan. 14, 1947 |
| 2,839,357 | Clark et al. | June 17, 1958 |
| 2,894,813 | Boniel et al. | July 14, 1959 |
| 2,910,442 | Kaplan | Oct. 27, 1959 |
| 2,942,008 | Lubowe | June 21, 1960 |

FOREIGN PATENTS

| | | |
|---|---|---|
| 1,077,645 | Germany | Mar. 17, 1960 |

OTHER REFERENCES

Mellor: Comprehensive Treatise on Inorganic and Theoretical Chemistry, Longmans, Green and Company, vol. 11, page 101 (1931).